(No Model.)
E. C. ATWOOD.
TRUCK.
No. 599,923.  Patented Mar. 1, 1898.
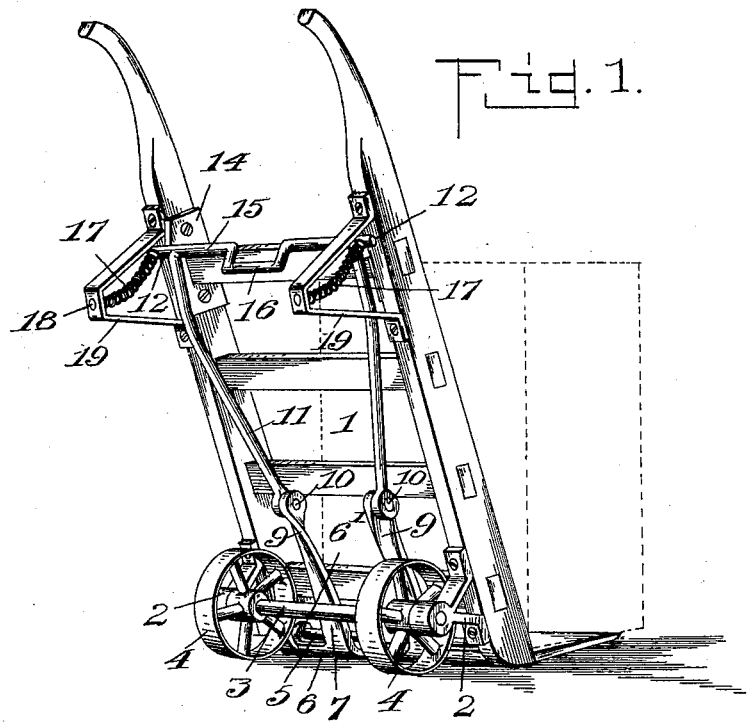
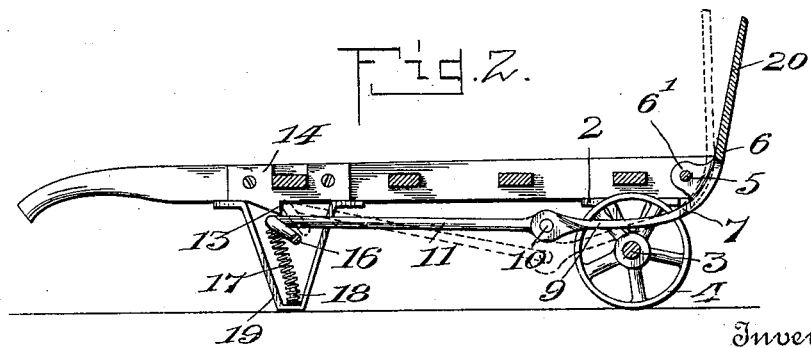
Witnesses
Harry W. Hahn
Victor J. Evans
Inventor
Ernest C. Atwood.
by John Wedderburn
Attorney

UNITED STATES PATENT OFFICE.

ERNEST C. ATWOOD, OF GOLDEN GATE, CALIFORNIA.

TRUCK.

SPECIFICATION forming part of Letters Patent No. 599,923, dated March 1, 1898.

Application filed June 24, 1897. Serial No. 642,184. (No model.)

*To all whom it may concern:*

Be it known that I, ERNEST C. ATWOOD, a citizen of the United States, residing in the town of Golden Gate, county of Alameda, and State of California, have invented certain new and useful Improvements in Trucks; and I do hereby declare the following to be a full, clear, and exact description of the invention, such as will enable others skilled in the art to which it appertains to make and use the same.

This invention relates to certain improvements in that class of devices known generally in the art as "trucks," which are provided for the convenient handling and shifting of bulky and heavy articles.

The invention has for its prime objects to provide a device of this class simple, durable, and inexpensive in construction, and by the use of which the ease of loading and unloading the truck is greatly facilitated, thereby rendering the truck capable of being easily and succcessfully employed in shifting merchandise otherwise too heavy or bulky for this mode of handling.

The invention is clearly illustrated in the accompanying drawings, and in both views shown like numerals of reference indicate like parts throughout, and in which—

Figure 1 is a perspective view of an ordinary inside-wheel truck, showing my invention positioned thereon. Fig. 2 is a central longitudinal section of the same.

Referring now to the above figures by numerals, 1 represents an ordinary hand-truck, which is provided with the lower depending brackets 2 2, on which are hung by means of the axle 3 the ordinarily-formed wheels 4 4. Above the axle 3 and parallel thereto is hung the cross-rod 5, on which is revolubly mounted, by means of the integrally-formed lugs 6′, the metal spade or shovel 6. Curved backward from the shovel 6 and integrally formed therewith or rigidly secured thereto are the twin arms 7 7, which are twisted at right angles at the points 9 9 to form terminal bearings, which are connected by means of the pivots 10 10 to the opposite legs 11 11. These legs 11 11 are connected at their upper extremities by the cross-rod 15, whose projecting extremities 12 12 are adapted to rest in the notches 13 13, formed in the plates 14 14, which latter are securely screwed or fastened to the handles of the truck. The central portion of the cross-rod 15 is bent out or offset to form the handle 16, while the springs 17 17 are interposed between pins 18 18 on the ordinarily-formed legs 19 19 and the extremities 12 12, thereby holding the latter in the notches 13 13. The opposite extremities of the shovel 6 are connected by the integrally-formed cross member 20, as is usual in hand-trucks of the stationary shovel variety.

Having thus fully set forth the principal points of construction of my invention, it is now incumbent upon me to explain its mode of operation.

It is well known that in the ordinary truck the stationary shovel is positioned at an obtuse angle with the direction of the handles or the position shown in Fig. 1. It will be further observed that a line drawn coincident with the direction of the shovel will be tangent to the periphery of the wheels, or, in other words, as the shovel is inserted beneath the load the wheels will rest on the ground, as shown in Fig. 1, the load being represented in dotted lines. Now in this position of the truck and load the dead-weight of the latter has to be overcome by grappling with a hook or the hands and drawn over against the handles of the truck before it can be handled as desired. In this method the leverage that lies latent in the construction of the truck is useless in loading.

To bring the leverage of the truck into play, I have provided the construction shown, and it will be evident to all those familiar with the use of trucks that by making it possible to bring the handles up against the face of the load and at the same time change the fulcrum of leverage from the point of contact of the wheels with the ground to the lower inner edge of the load the latter can be readily raised and in its course fall back until the wheels of the truck touch the ground, when the matter of wheeling the load away is an easy operation. This operation is made possible by my mechanism shown, for the spade, being in the position shown in solid lines in Fig. 2, is forced under the load in the usual manner, after which the handles are forced up against the load and the cross-rod 15 drawn along until the springs 17 17 force the extremities 12 12 into the notches 13 13, when the several parts will be firmly held in the position shown in dotted lines in Fig. 2.

When it is desired to unload the truck, the latter, after being tilted forward until the load rests on the ground, the extremities 12 12 are forced out of the notches 13 13 by grasping the handle 16.

I am well aware that various mechanical equivalents can be substituted for tilting and locking the pivoted shovel without departing from the spirit or sacrificing the advantages of my invention, and I therefore reserve the right to make such changes and alterations as fairly fall within its scope.

What I claim, and desire to secure by Letters Patent, is—

1. A truck provided with a terminal shovel and means for changing the angle between said shovel and the direction of the handles of the truck, said shovel being so connected with said truck that the distance between the outer extremity of the former and the lower extremity of the latter will remain approximately constant substantially as set forth.

2. A truck provided with a hinged shovel having a relatively stationary pivot, arms leading from said shovel and rigidly connected thereto and means for locking said arms in the desired position substantially as set forth.

In testimony whereof I have signed this specification in the presence of two subscribing witnesses.

ERNEST C. ATWOOD.

Witnesses:
GEORGE A. STONE,
ADAM ARNOLD.